May 29, 1928.  1,671,121
B. V. NORDBERG
SYSTEM FOR EQUALIZING THE LOAD ON PRIME MOVERS
Filed May 24, 1924  5 Sheets-Sheet 1

INVENTOR.
BRUNO V. NORDBERG
BY
ATTORNEYS.

May 29, 1928.

B. V. NORDBERG 1,671,121

SYSTEM FOR EQUALIZING THE LOAD ON PRIME MOVERS

Filed May 24, 1924     5 Sheets-Sheet 2

INVENTOR.
BRUNO V. NORDBERG
BY
ATTORNEYS.

May 29, 1928.

B. V. NORDBERG 1,671,121

SYSTEM FOR EQUALIZING THE LOAD ON PRIME MOVERS

Filed May 24, 1924   5 Sheets-Sheet 3

INVENTOR.
BRUNO V. NORDBERG
BY
ATTORNEYS.

May 29, 1928.　　　　　　　　　　　　　　　　1,671,121
B. V. NORDBERG
SYSTEM FOR EQUALIZING THE LOAD ON PRIME MOVERS
Filed May 24, 1924　　　5 Sheets-Sheet 5

INVENTOR.
Bruno Victor Nordberg
BY
Bottum, Hudnull, Lecher and McNamara,
ATTORNEY.

Patented May 29, 1928.

1,671,121

UNITED STATES PATENT OFFICE.

BRUNO VICTOR NORDBERG, OF MILWAUKEE, WISCONSIN, ASSIGNOR TO NORDBERG MFG. CO., OF MILWAUKEE, WISCONSIN, A CORPORATION OF WISCONSIN.

SYSTEM FOR EQUALIZING THE LOAD ON PRIME MOVERS.

Application filed May 24, 1924. Serial No. 715,652.

This invention relates to a system for equalizing the load on a prime mover.

It relates particularly to hoisting engines for mine shafts.

The hoisting engines for mine shafts have heretofore been provided with friction brakes. As the depth of a shaft increases, the size of the brake must also be increased to provide for the added moment of inertia of the rope and drum therefor. When a mine shaft reaches a depth of 6000 feet or over, the friction brake must be made of such large dimension that it heats up and frequently breaks down. Mining today has reached such a stage that the depths of the shafts are being increased to as much as 7000 and 8000 feet. It has been found from experience that hoisting engines for shafts of these greater depths are subjected to loads which vary within wide limits. Large and cumbersome conical drums have been used in an effort to balance the descending load with the ascending load so that the power required for braking will be within the range of operation of the friction brakes.

In accordance with my invention, as preferably embodied, an air engine of the type disclosed in my Patent No. 926,819 is connected to a prime mover, so that the action of the air engine is changed to either that of a motor to act with the prime mover, or to that of an air compressor to retard the action thereof and act as a brake, the air compressed during the braking action being stored for future use to drive the air engine as a motor. The retarding or braking effect of the air engine, when it acts as a compressor, is such that the use of large and cumbersome friction brakes to retard the motion of the drum shaft is unnecessary.

The prime mover carries a constant load equal substantially to the power necessary to lift the useful load such as ore and coal, plus friction losses. The power developed by the prime mover is maintained substantially constant throughout the run by a suitable governor.

The negative or non-useful work due to the overbalancing action of the descending rope and the moments of inertia of the moving masses is used to drive the air engine as a compressor. The air compressed is stored in a suitable receiver and made available for running the air engine as a motor in accelerating the drum shaft and lifting the next load.

The air engine and the valve gear therefor are of such construction that either positive or negative work can be developed. The valve gear is controlled to vary the work done by the air engine from a maximum positive value to zero, and from zero to a maximum negative value. When the air engine is doing positive work it is acting as a motor and boosting the prime mover. When the air engine is doing negative work, however, it is acting as an air compressor to retard the motion of the drum shaft and to store compressed air for use in accelerating the drum shaft and in lifting.

An object of the invention is to connect a convertible air engine with a prime mover for cooperation therewith so that the load on the prime mover is maintained at a substantially constant value.

Another object is to provide an improved hoisting system in which the energy necessary for braking action is stored up for future use in hoisting or lifting.

Another object is to provide a hoisting system for mine shafts which is reliable and efficient, and which may be economically manufactured.

Other objects and advantages will hereinafter appear.

For the purpose of illustrating the invention, an embodiment thereof is shown in the drawings, in which.

Figure 1:
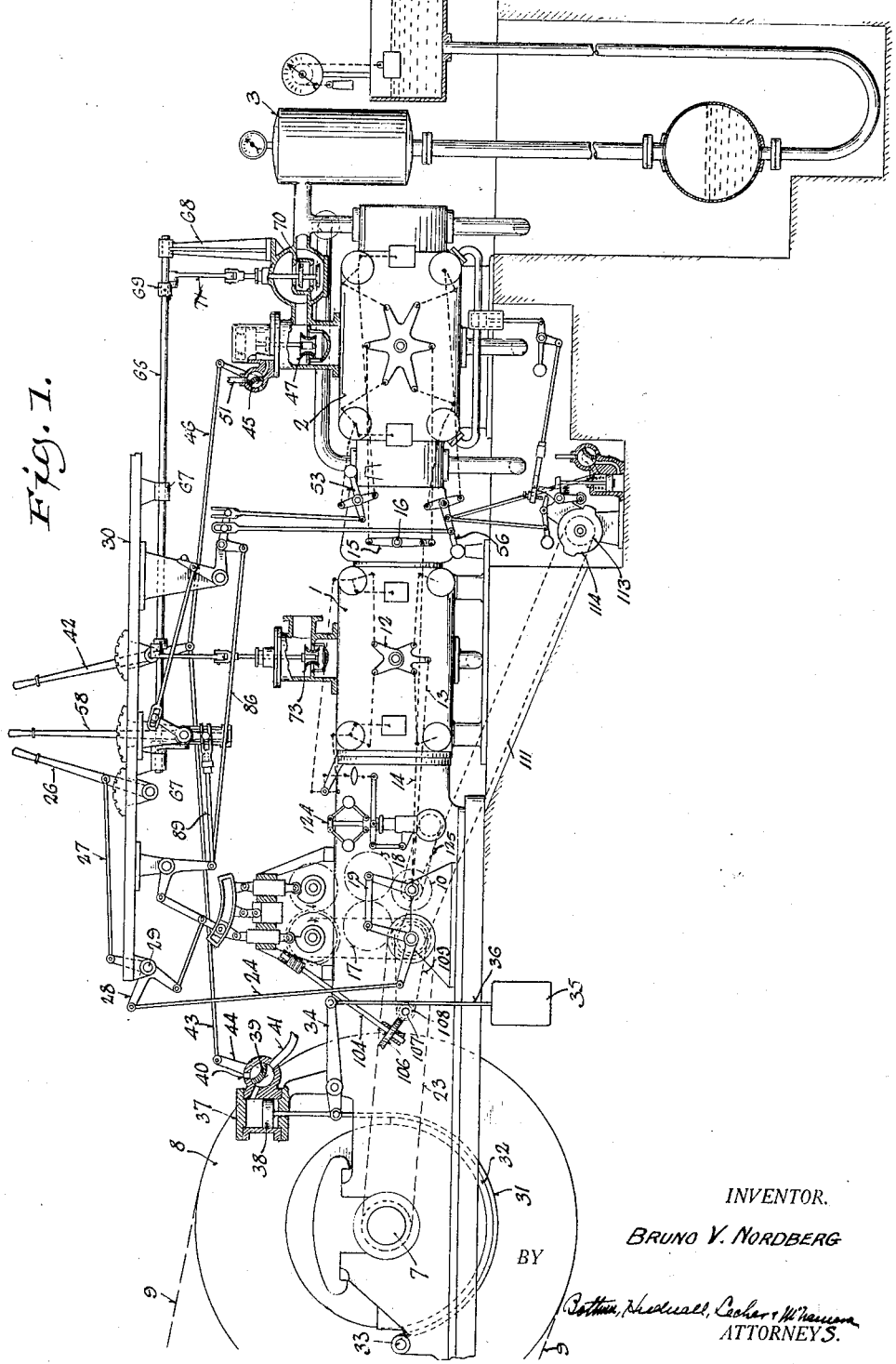
Figure 1 is a diagrammatic view showing the manner of connecting the air engine to a steam engine or prime mover and the general arrangement of the valve gears and control.

The invention comprises, in general, a prime mover 1, an air engine 2 connected for cooperation therewith to maintain the load on the prime mover substantially constant, and an air receiver 3 to store the air compressed when the air engine acts as an air compressor.

Figs. 1 to 4 will first be described.

The prime mover 1 is shown as a steam engine having Corliss valve gear. The piston rod 4 is extended through the head end of the steam cylinder into the crank end of the air cylinder to connect with the piston 5 therefor. The steam piston 6 and the air piston 5 are thereby directly connected for movement together.

The connecting rod of the steam engine is connected to the drum shaft 7 for the drum 8. A double rope or cable 9 extends around the drum for connection with the cages.

A gear wheel 10, suitably mounted to the engine frame on a shaft 11, is provided with two eccentrics, one of which actuates the wrist plate 12 of the steam engine by means of the eccentric rod 13. The other eccentric is connected by an eccentric rod 14 to a lever 15 pivotally mounted at 16 to the engine frame. The wrist plates for the inlet and outlet valves of the air engine are connected to opposite ends of the lever 15 for movement therewith, as shown in Fig. 1.

A pair of gears 17 and 18 are mounted for rotation in a suitable frame 19. The gear 17 meshes with gear 18. Gear 18, in turn, meshes with gear 10. A gear 20 is mounted on a shaft 21 to drive gear 17. A second gear 22 is mounted on shaft 21 and may be connected to the drum shaft 7 by a chain 23 to drive gear 20.

A rod 24 is connected to an arm 25. A member 26 of frame 19 is fixed against movement with respect to arm 25 so that movement thereof shifts the frame and causes gear 17 to roll upon gear 20 to change the action of the valve gears of the steam and air engines. The engines are thereby reversed.

Rod 24 may be actuated by means of a lever 26 connected thereto by a rod 27 and a bell-crank 28 mounted on a shaft 29 secured to the under side of the platform 30.

The drum 8 is provided with a friction brake comprising a strap 31 having a brake lining 32. One end of strap 31 is secured to the engine frame at 33, and the other end thereof is pivotally connected to one end of a lever 34 pivotally mounted in any suitable way to the engine frame. A weight 35 is suspended from the opposite end of lever 34 by means of a rod 36 to urge the lever in a clockwise direction to apply the brake. A cylinder 37, having the piston 38 thereof connected to the lever 34 as shown, provides a means for releasing the brake to permit rotation of the drum shaft. The cylinder 37 is provided with a valve 39 arranged to connect the upper side of piston 38 with an exhaust passage 40 or an inlet passage 41 for steam or air. Valve 39 is shown in position to admit steam or air to the upper side of piston 38 to move the same downwardly against the action of weight 35 and release the brake.

The valve 39 may be actuated by means of a lever 42 connected thereto by a rod 43 and an arm 44.

Lever 42 is also connected to a pilot valve 45 by a rod 46.

Figure 2:
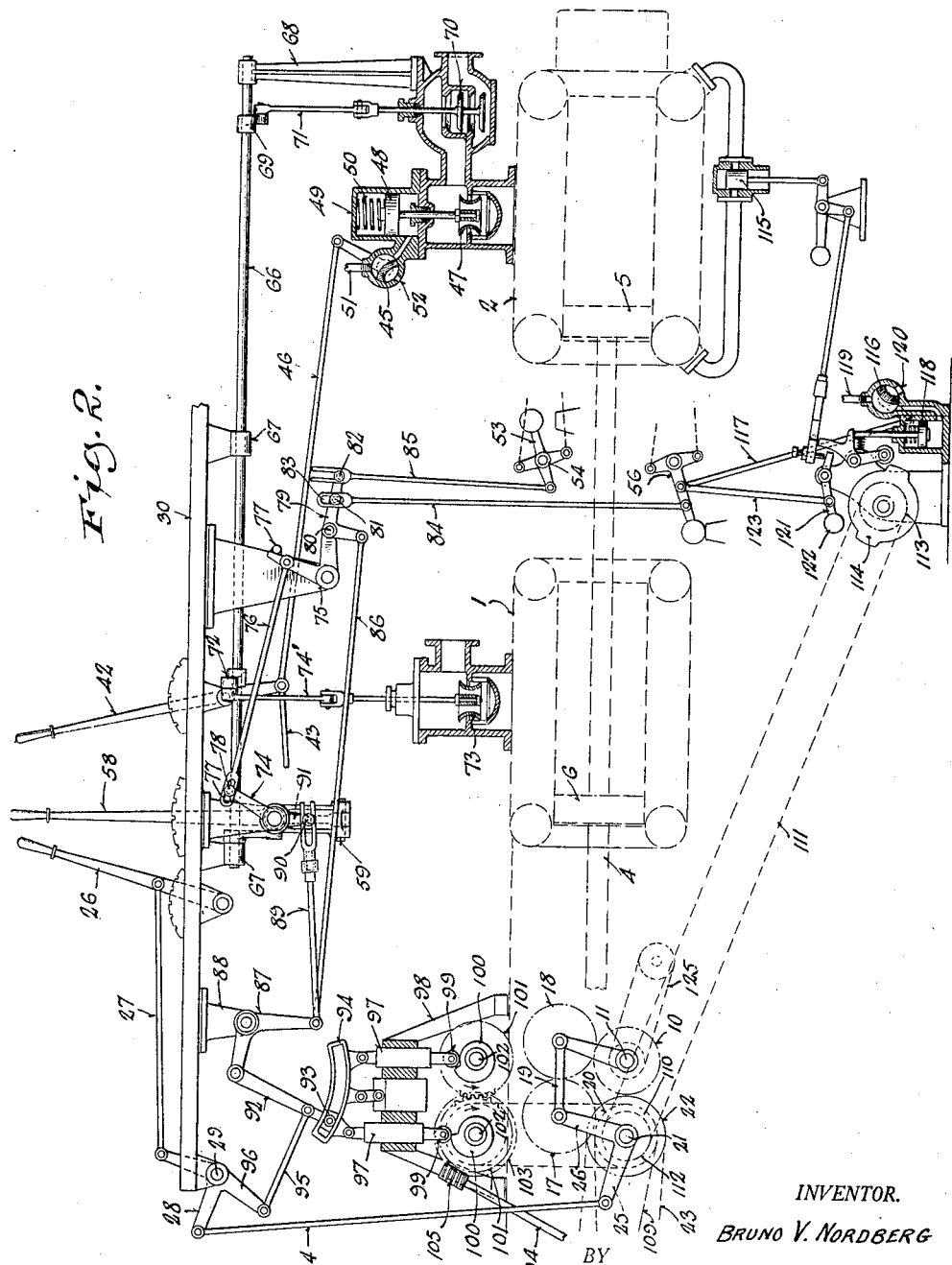
Fig. 2 is a diagrammatic view showing, in greater detail, the control mechanism.
Figure 3:
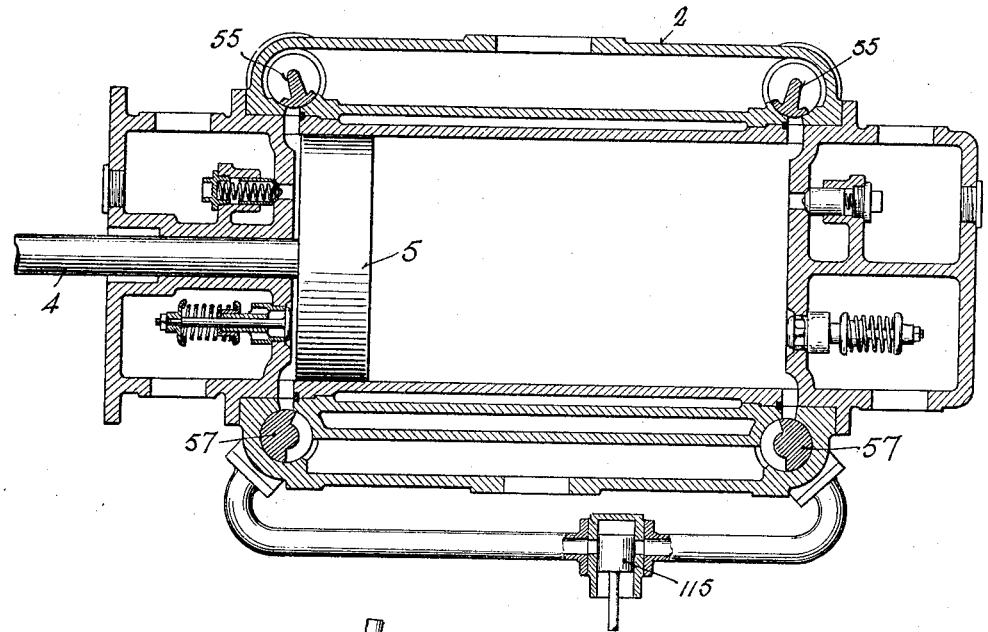
Fig. 3 is a central vertical section through the air engine.

The air engine 2 is provided with a throttle valve 47 connected to a piston 48 arranged within a cylinder 49, as shown in Fig. 2. A spring 50 urges the piston 48 in a downward direction to hold valve 47 in closed position. When lever 42 is in the position shown in Figs. 1 and 2, valve 45 is in position to connect the under side of piston 48 with a steam or air supply pipe 51 to raise the piston to hold valve 47 in open position.

The lever 42 is moved to either an extreme position to the left or to the right.

When lever 42 is in its extreme position to the right, valve 39 is in position to connect the upper side of piston 38 to the exhaust passage 40 and valve 45 is in position to connect the under side of piston 48 with an exhaust passage 52 to permit piston 48 to move downwardly under the action of spring 50.

The throttle valve 47 for the air engine is then closed and the friction brake for the drum shaft applied. The lever 42 thereby controls the friction brake for the drum shaft 7 and the throttle valve 47 for the air engine.

A lever 53, pivotally mounted at 54, is connected to the trip cams which control the points of cut-off of the inlet valves 55 for the air engine. A similar lever 56 is connected to the trip cams which control the points of cut-off of the exhaust valves 57 for the air engine. Movement of the levers 53 and 56 on their pivots varies the cut-off of the valves 55 and 57 to change the air engine into either a motor or an air compressor. The manner in which these levers act, and the principle of operation involved to convert or change the air engine into either a motor or an air compressor, is fully described in my above Patent No. 926,819. The structure of the air engine and the valve gear and control mechanism therefor is only described and shown in sufficient detail to show the manner in which the air engine of my above patent may be connected to a prime mover, such as the steam engine shown in the drawings, to attain the objects of my invention.

Figure 4:
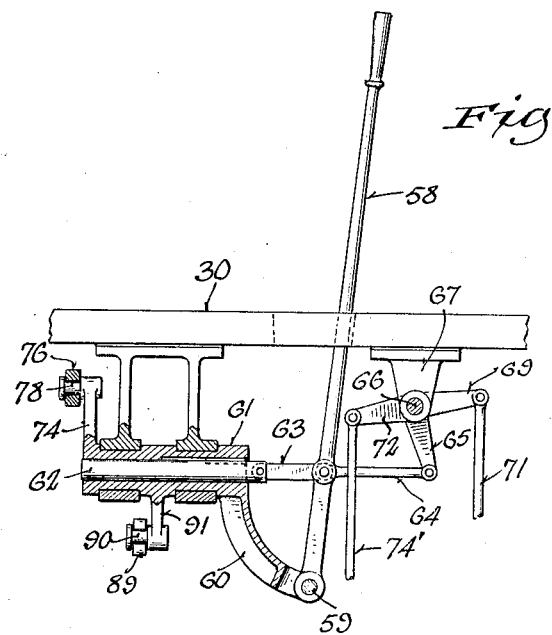
Fig. 4 is a detail view, partly in section, of one of the control levers.

A lever 58 is pivotally connected at 59 to an arm 60 of a sleeve 61, as shown in Fig. 4. The sleeve 61 is rotatably mounted in suitable brackets secured to the under side of the platform 30. The sleeve 61 is hollow to receive a plunger 62 connected to lever 58 by a link 63. A rod 64 connects lever 58 with an arm 65 fixed to a shaft 66. The shaft 66 is rotatably mounted in suitable brackets 67 secured to the under side of the platform and a standard 68 supported by the platform and a standard 68 supported by the air engine in any suitable way. An arm 69, fixed to shaft 66, is connected to a main throttle valve 70 for the air engine by a rod 71. A similar arm 72 is fixed to shaft 66 and connected to a throttle valve 73 for the steam engine or prime mover 1 by a rod 74', as shown. When the lever 58 is moved to the right as viewed in Fig. 4, the arms 69 and 72 are moved to close the valves 70 and 73. When the lever 58 is moved to a vertical position as viewed in Fig. 4, valves 70 and 73 are opened.

The sleeve 61 is provided with an arm 74, connected to a bell-crank 75 by a rod 76. A stop 77 limits the movement of the bell-crank in one direction. One end of rod 76 is provided with a slot 77 to receive a pin 78, carried by the arm 74.

A bell-crank 79 is pivotally mounted at 80 to one arm of bell-crank 75, as shown in Fig. 2. One arm of bell-crank 79 is provided with pins 81 and 82. Pin 81 works in a slot 83 at the upper end of a rod 84 connected to the lever 56. Pin 82 is received by the forked end of a rod 85 connected to the lever 53.

The lower arm of bell-crank 79 is connected by a rod 86 to an arm of a bell-crank 87 pivotally mounted in a bracket 88 to the underside of platform 30. The same arm of bell-crank 87 is pivotally connected to a rod 89 having a forked end to receive a pin 90 fixed to an arm 91 with which sleeve 61 is provided. The other arm of bell-crank 87 is pivotally connected to a member 92 having a block 93 pivotally mounted at the lower end thereof for sliding movement within a link 94. The member 92 is connected by a rod 95 to an arm 96 fixed for movement with the bell-crank 28.

The link 94 is pivotally connected to and supported by plungers 97 slidably mounted in a suitable support 98 secured to the engine frame. The lower ends of plungers 97 are provided with rollers 99 which ride upon cams 100 fixed to gear wheels 101 mounted on shafts 102. The gears 101 are in mesh. A worm wheel 103 is fixed to one of the gears 101 for rotation therewith. A shaft 104 is provided at one end thereof with a worm 105 to mesh with the worm wheel 103, and a worm wheel 106 at the other end thereof to mesh with a worm fixed to a shaft 107. A gear wheel 108, fixed to shaft 107, is connected by means of a chain 109 to a gear wheel 110 fixed to shaft 21. Cams 100 are thereby driven from the drum shaft 7, the worm gearing providing sufficient reduction so that each cam makes almost one complete revolution while the drum and drum shaft make a sufficient number of revolutions to carry a cage from the bottom of the shaft to the dump.

A third plunger or weight may be arranged between plungers 97 and connected to the link 94, as shown, to hold the rollers 99 in engagement with the cams 100.

A chain 111 connects a gear wheel 112 fixed to shaft 21 to a gear wheel 113 to rotate a cam 114 of an intensifier for the air engine.

The cam 114 cooperates with other parts of the intensifier to actuate a piston valve 115 to connect one side of the piston of the air engine with the other side thereof when the engine is acting as a compressor. The braking effect of the air engine is thereby increased. A valve 116 is actuated by a rod 117 to connect the under side of a piston 118 to a pressure supply 119 or to an exhaust passage 120. A lever 121, having a weight 122 at one end thereof, is actuated by a rod 123 to move the parts of the intensifier into operative engagement with each other. The rods 117 and 123 are pivotally connected to lever 56 for movement therewith.

The structure and principle of operation of the intensifier is fully described and claimed in my Patent No. 1,138,886. The intensifier is therefore only shown and described in sufficient detail to show the manner in which it may be used in the present embodiment of my invention.

The structure and principle of operation of the air receiver 3 to store the air compressed when the air engine acts as a compressor is fully shown and described in my Patent No. 1,231,051. The air receiver is therefore simply shown and referred to in the specification to show its relative position with respect to the air compressor and the manner in which it may be used in the present embodiment of my invention. Other types of air receivers, of course, may be used.

The steam engine or prime mover 1 is provided with a suitable governor 124 driven from shaft 11 by a chain 125.

The manner in which the air engine 2 functions to equalize the load on the prime mover 1, and the manner of storing the energy necessary for braking action, for future use in lifting, will now be described.

Figs. 1 and 2 show the general arrangement and the positions of the parts of the system at the beginning of a run, when one of the cages is at the dump ready to descend for a load, and the other cage is at the bottom of the shaft with a load.

Lever 26 is first moved to its extreme position to the right to shift frame 19 to its extreme position to the right and cause gear 17 to roll upon gear 20 to reverse the action of the valve gears for the prime mover 1 and the air engine 2.

Lever 42 is next moved to its extreme position to the left to move valve 39 so that the top of piston 38 is connected with the steam or air supply 41 to move the piston downwardly against the action of weight 35 to release the friction brake 31. Valve 45, through its connection 46 with lever 42, will then be in the position shown to connect the under side of piston 48 to the steam or air supply 51 to raise the piston and open the throttle valve 47 of the air engine.

Lever 58 is then moved to the left, as viewed in Fig. 4, to rotate shaft 66 in a clockwise direction to open the throttle valves 70 and 73 for the air and steam engines.

The steam and air engines will then start to accelerate the drum shaft 7.

Lever 53 is in its extreme upper position while lever 56 is in its extreme lower position, so that the air engine operates as a motor, as explained in my Patent No. 926,819.

The drum shaft then accelerates, due to the combined action of the steam and air engines, until governor 124 acts to hold the speed of the steam engine at the predetermined value for which it is set, to develop sufficient power to lift the useful load plus the friction losses.

The additional power required, in starting, to overcome the moments of inertia of the drum, rope, cages and other parts is supplied by the air engine.

As the speed of the drum shaft increases from zero to its maximum value, as determined by the adjustment of governor 124, less power is required from the air engine to accelerate the shaft and the drum.

When the ropes and cages are in balance, no power is required from the air engine, since at this time the non-useful load due to the ropes and cages will be negligible or zero.

The ropes and cages will again be out of balance an instant later, and the downgoing rope will act with the prime mover. At this time, however, the air engine is changed to a compressor so that the work done by the downgoing rope is used to drive the air engine and store compressed air for the return run. This places sufficient load upon the prime mover so that the speed of the drum shaft will not exceed that for which the governor 124 is set.

The air engine thereby equalizes the load on the prime mover 1 by acting as a motor when the load is in excess of that for which the prime mover is rated, and by acting as an air compressor when the load is below that for which the prime mover is rated. The prime mover therefore operates under full load through substantially the entire run.

It is necessary to provide means to vary the power developed by the air engine from a maximum positive value to zero, at which time the ropes and cages are in balance. Cams 100 are provided for this purpose.

Gears 101, through their worm gear connection with shaft 107, rotate the cams in directions indicated by the arrows. The left hand cam rotates to gradually lower plunger 97, while the right hand cam rotates to gradually raise the other plunger 97. The block 93 is in position directly over the left hand plunger, so that rod 86 is moved slowly to the right to rotate bell-crank 79 in a counter-clockwise direction and raise pins 81 and 82. Lever 53 will then drop slowly under the action of the weight at the end thereof to advance the points of cut-off of the inlet valves 55 of the air engine, so that the power developed thereby is gradually decreased from a maximum positive value to zero.

Cams 100 are so designed relative to the depth of the shaft that the lever 53 will be in its lowermost position when the ropes and cages are in balance. At this time the steam engine assumes the entire load represented by the useful work plus the friction losses, and maintains the speed substantially constant by means of governor 124, as explained above.

As the end of the run is reached, and the ropes and cages are again out of balance, it is necessary to retard the action of the hoisting engine and to finally bring the same to a standstill. This is provided for by the continued motion of cams 100 which will then be in position to lift lever 56 to change the air engine to a compressor. At this time lever 58 is moved to the right by the operator, as shown in Fig. 4, to close the throttle valves 70 and 73 for the air and steam engines.

Pin 81 will then engage the upper end of slot 83 and raise lever 56. This movement of lever 56 advances the points of cut-off of the exhaust valves 57 for the air engine, so that the air engine acts as an air compressor and develops negative power, increasing from zero to a maximum negative value.

The air compressed at this time is stored in the air receiver 3, as explained in my above patent.

The rods 117 and 123 may be of such length that when the cages are almost at the end of the run, the intensifier will be brought into action to increase the braking effect of the air engine, as explained in my Patent No. 1,138,886.

The drum shaft is finally brought to a standstill by movement of lever 42 to its extreme position to the right to close the throttle valve 47 for the air engine and to apply the friction brake 31 to the drum shaft.

The friction brake 31 absorbs a relatively small amount of energy and is not applied until the movement of the drum shaft has been reduced to almost zero by the braking action of the air engine.

Lever 26 is then moved to its extreme position to the left to reverse the engines for the return run. The block 93 will then be over the right hand plunger 97 and the cams will rotate in opposite directions to lower the right end of the link 94 and raise the left end thereof.

It is desirable that some means be provided to control the action of the air compressor independently of the automatic means or cams 100. Lever 58 is connected to the bell-cranks 75 and 87 by the rods 76 and 89, for this purpose.

Under normal conditions, bell-crank 75 will be in the position shown in Fig. 2, the weight of the bell-crank 79 being sufficient to hold the upper arm of bell-crank 75 against the stop 77.

If it is desired to advance the points of cut-off of the inlet valves 55, lever 58 is moved to the left, as viewed in Fig. 2. When the pin 78 engages the end of the slot 77, the bell-crank 75 will be rotated in a counter-clockwise direction to raise the bell-crank 79 and the pins 81 and 82 carried thereby. If this movement of lever 58 is continued, lever 53 will be moved to its lowermost position to reduce the power developed by the air engine from its maximum positive value to zero, and lever 56 will be raised and the intensifier finally brought into action to increase the power developed by the engine from zero to its maximum negative value.

It is thereby possible to control the action of the air engine independently of the automatic means therefor.

If it is desired to decrease the braking effect of the air engine and increase the power developed thereby in a positive direction, lever 58 is moved to the right as viewed in Fig. 2. Bell-crank 75 will then rotate in a clockwise direction due to the weight of bell-crank 79, until the upper arm thereof engages stop 77.

Further movement of lever 58 to the right will bring the pin 90 into engagement with the forked end of rod 89 to rotate bell-crank 87 in a clockwise direction. The rod 86 will then be pulled toward the left to rotate bell-crank 79 in a clockwise direction and permit lever 56 to drop to its lowermost position and raise lever 53 to its uppermost position. The power developed by the air engine may thereby be changed from a maximum negative value to a maximum positive value independently of the automatic means therefor.

A single rope may be used instead of the double rope shown in the drawings. The system will then always be out of balance so that during the downward run into the shaft, the air engine will act as an air compressor to store compressed air capable of doing substantially the non-useful work done by the cage and rope in dropping from the dump to the bottom of the shaft. The air engine will act as a motor for a relatively short period, at starting, to accelerate the drum shaft. When the drum shaft is brought up to the required speed, however, the air engine is converted into an air compressor and the throttle valves for the steam and air engines closed. In lifting, the air engine of course acts as a motor to boost the prime mover. When the cage approaches the dump, however, it may be found necessary to convert the air engine into a compressor to retard the action of the drum shaft. The cams 100 will be changed to control the action of the air engine accordingly.

Figure 5:
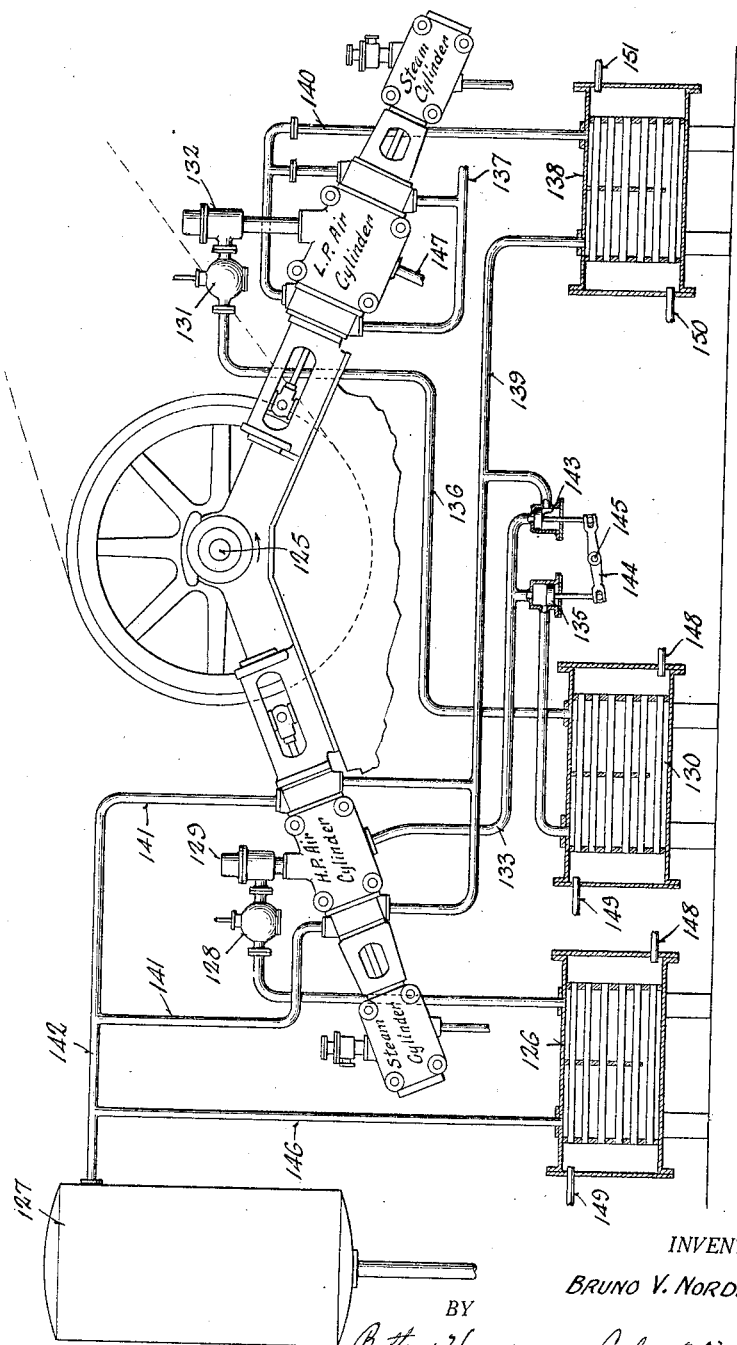
Fig. 5 is a diagrammatic view showing an embodiment of the invention in which the air and steam engines are compounded and Figure 6 is a diagrammatic view showing the compounded type of Figure 5 equipped with the valve gear of Figures 1 and 2.

In the modification shown in Fig. 5, the air and steam engines are compounded and connected to a drum shaft 125 with their center lines at an angle of substantially 135 degrees.

A heater 126 is connected between the air receiver 127 and the throttle valves 128 and 129 for the high pressure air cylinder.

A second heater 130 is connected between the exhaust of the high pressure air cylinder and the throttle valves 131 and 132 for the low pressure air cylinder by a pipe 133, a valve 135, and a pipe 136.

A pipe 137 connects the suction valves of the low pressure cylinder with the atmosphere.

A cooler 138 is connected between the high and low pressure cylinders by pipes 139 and 140.

The outlet valves for the high pressure cylinder are connected to the receiver 127 through pipes 141 and an air main 142.

A valve 143 is arranged to connect the exhaust valves of the high pressure cylinder with the cooler 138 through pipes 133 and 139, as shown.

A lever 144 pivotally mounted at 145 is connected to the valves 135 and 143, as shown, so that valve 135 is open when valve 143 is closed, and vice versa.

When the air engine acts as a motor to boost the steam engine, lever 144 is moved to open valve 135 and close valve 143. Air passes from the receiver through pipe 146, heater 126 and the throttle valves 128 and 129 to the inlet valves of the high pressure cylinder. The air is then exhausted through the exhaust valves, pipe 133 and valve 135 into the heater 130, and thence through pipe 136 and the throttle valves 131 and 132 of the low pressure cylinder to the inlet valves therefor. The air is then exhausted to the atmosphere through the exhaust pipe 147.

When the air engine is acting as an air compressor, lever 144 is turned in a clockwise direction to open valve 143 and close valve 135. Air is drawn into the low pressure cylinder through pipe 137 and discharged through pipe 140 into the cooler 138, and thence through pipe 139 into the suction side of the high pressure cylinder. The air is then discharged from the high pressure cylinder through pipes 141 and 142 into the air receiver 127.

Should the pressure in receiver 127 equal the maximum pressure attained in the high pressure air cylinder, the valves and valve gear of the latter would act to raise the pressure in cooler 138 and pipes 133 and 139 connecting the latter to the exhaust side of this cylinder. At this time, valve 135 will be closed to prevent air from passing into the heater 130.

The heaters 126 and 130 are provided with steam inlets 148 and steam outlets 149.

The cooler 138 is provided with an inlet 150 and an outlet 151 for the cooling water. The heaters and the cooler may be of any suitable construction.

The air between stages is thereby cooled when the air engine is acting as a compressor, and is heated when the air engine is acting as a motor. The efficiency of the air engine is thereby materially increased.

The valves 135 and 143 provide means to connect either the cooler 138 or the heater 130 between the stages.

Figure 6:
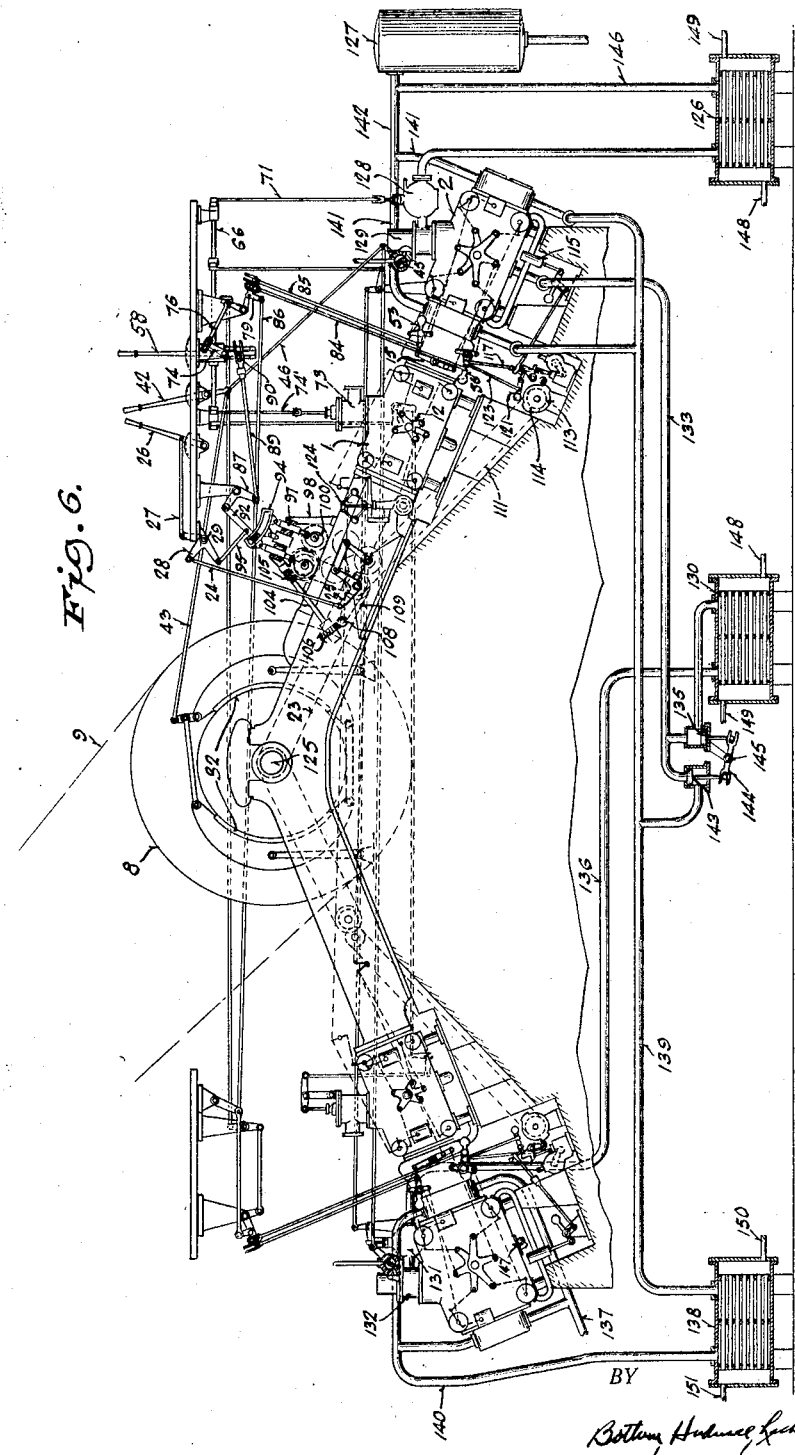

The valves and valve gear and the controlling means therefor for the steam and air cylinders in Figure 5 are identical to the mechanism shown in Figures 1 to 4. Figure 6 illustrates diagrammatically one way of applying this valve gear to the compound type of Figure 5. The description hereinabove applies to the valve gear of Figure 6.

The drawings and specification disclose several embodiments of my invention, but of course various changes of structure and arrangement of the parts may be adopted without departing from the spirit of the invention or the scope of the claims.

It is to be understood that while the prime mover shown in the drawings and described in the specification is a steam engine, that this type of prime mover is selected merely for the sake of illustration and that it may be replaced by a suitable electric motor.

The invention claimed is:

1. Hoisting apparatus of the character described comprising a hoisting drum, a prime mover of the fluid-pressure type, an air engine, a piston rod common to said prime mover and engine and operatively connected to said drum for operating and controlling the movements of the same, and controlling means operated in synchronism with the hoisting drum for causing said air engine to act as a motor to supplement the action of said prime mover or to act as a compressor to retard the action of the latter.

2. In combination, a prime mover, an air engine connected to said prime mover for cooperation therewith, said air engine being provided with valves and valve gear therefor arranged to cause said air engine to act as a motor to boost said prime mover or to act as an air compressor to place a load upon said prime mover to retard the action thereof, an air receiver connected to said air engine to store the air compressed when said air engine is acting as a compressor for use to drive said air engine when the same is acting as a motor, and means to control the action of said air engine, said means comprising a cam and connections between said cam and the valves and valve gear for said air engine.

3. In combination, hoisting apparatus, a prime mover for operating the latter, an air engine connected to said prime mover for cooperation therewith, said air engine being provided with valves and valve gear therefor arranged to cause said air engine to act as a motor to boost said prime mover or to act as an air compressor to place a load upon said prime mover to retard the action thereof, an air receiver connected to said air engine to store the air compressed when said air engine is acting as a compressor for use to drive said air engine when the same is acting as a motor, and means connected to and synchonized with said apparatus in such wise as to automatically control the action of said air engine to cause the latter to compensate for the varying load on said prime mover during operation of said apparatus.

4. In combination, hoisting mechanism, a prime mover thereof, an air engine connected to said prime mover for cooperation therewith, said air engine being provided with valves and valve gear therefor arranged to cause said air engine to act as a motor to boost said prime mover or to act as an air compressor to place a load upon said prime mover to retard the action thereof, an air receiver connected to said air engine to store the air compressed when said air engine is acting as a compressor for use to drive said air engine when the same is acting as a motor, automatic means operated in synchronism with the hoisting mechanism to control the action of said air engine, and manually operated means to control the action of said air engine independently of said automatic means.

5. In combination, a prime mover, an air engine connected to said prime mover for cooperation therewith, said air engine being provided with valves and valve gear therefor arranged to cause said air engine to act as a motor to boost said prime mover or to act as an air compressor to place a load upon said prime mover to retard the action thereof, an air receiver connected to said air engine to store the air compressed when said air engine is acting as a compressor for use to drive said air engine when the same is acting as a motor, automatic means to control the action of said air engine, said means comprising a cam and connections between said cam and the valves and valve gear for said air engine, and manually operated means to control the action of said air engine independently of said automatic means.

6. In combination, a steam engine, an air engine connected to said steam engine for cooperation therewith, said engines having a common piston rod, said air engine being provided with valves and valve gear therefor arranged to cause said air engine to act as a motor to boost said steam engine or to act as an air compressor to place a load upon said steam engine to retard the action thereof, an air receiver connected to said air engine to store the air compressed when said air engine is acting as a compressor for use to drive said air engine when the same is acting as a motor, and means to control the action of said air engine, said means comprising a cam and connections between said cam and the valves and valve gear for said air engine.

7. In combination, hoisting mechanism, a steam engine operatively connected with the hoisting mechanism, an air engine connected to said steam engine for cooperation therewith, said engines having a common piston rod, said air engine being provided with valves and valve gear therefor arranged to cause said air engine to act as a motor to boost said steam engine or to act as an air compressor to place a load upon said steam engine to retard the action thereof, an air receiver connected to said air engine to store the air compressed when said air engine is acting as a compressor for use to drive said air engine when the same is acting as a motor, and automatic means operated in synchronism with the hoisting mechanism to control the action of said air engine.

8. In combination, hoisting mechanism, a steam engine operatively connected with the hoisting mechanism, an air engine connected to said steam engine for cooperation therewith, said engines having a common piston rod, said air engine being provided with valves and valve gear therefor arranged to cause said air engine to act as a motor to boost said steam engine or to act as an air compressor to place a load upon said steam engine to retard the action thereof, an air receiver connected to said air engine to store the air compressed when said air engine is acting as a compressor for use to drive said air engine when the same is acting as a motor, automatic means operated in synchronism with the hoisting mechanism to control the action of said air engine, and manually operated means to control the action of said air engine independently of said automatic means.

9. In combination, a steam engine, an air engine connected to said steam engine for cooperation therewith, said engines having a common piston rod, said air engine being provided with valves and valve gear therefor arranged to cause said air engine to act as a motor to boost said steam engine or to act as an air compressor to place a load upon said steam engine to retard the action thereof, an air receiver connected to said air engine to restore the air compressed when said air engine is acting as a compressor for use to drive said air engine when the same is acting as a motor, automatic means to control the action of said air engine, said means comprising a cam and connections between said cam and the valves and valve gear for said air engine, and manually operated means to control the action of said air engine independently of said automatic means.

10. In combination, a shaft, a steam cylinder and a high pressure air cylinder arranged for operative connection with said shaft, a second steam cylinder and a low pressure air cylinder arranged for operative connection with said shaft, a cooler, a heater, and means to connect either said cooler or said heater between low pressure and said high pressure air cylinders.

11. In combination, a shaft, a steam engine and a high pressure air engine connected for cooperation together and arranged for connection to said shaft, a second steam engine and a low pressure air engine connected for cooperation together and arranged for connection to said shaft, said air engines being provided with valves and valve gear therefor arranged to cause said air engines to act as motors to boost said steam engines or to act as air compressors to place a load upon said steam engines to retard the action thereof, an air receiver connected to said high pressure air engine to store the air compressed when said air engines are acting as compressors for use to drive said air engines when the same are acting as motors, and means to control the action of said air engines.

12. In combination, a shaft, a steam engine and a high pressure air engine connected for cooperation together and arranged for connection to said shaft, a second steam engine and a low pressure air engine connected for cooperation together and arranged for connection to said shaft, said air engines being provided with valves and valve gear therefor arranged to cause said air engines to act as motors to boost said steam engines, or to act as air compressors to place a load upon said steam engines to retard the action thereof, an air receiver connected to said high pressure air engine to store the air compressed when said air engines are acting as compressors for use to drive said air engines when the same are acting as motors, a cooler, a heater, means to connect said cooler between said air engines when the same are acting as compressors, and means to connect said heater between said air engines when the same are acting as motors.

13. In combination, a shaft, a steam engine and a high pressure air engine connected for cooperation together and arranged for connection to said shaft, a second steam engine and a low pressure air engine connected for cooperation together and arranged for connection to said shaft, said air engines being provided with valves and valve gear therefor arranged to cause said air engines to act as motors to boost said steam engines or to act as air compressors to place a load upon said steam engines to retard the action thereof, an air receiver connected to said high pressure air engine to store the air compressed when said air engines are acting as compressors for use to drive said air engines when the same are acting as motors, a cooler, a heater, pipes arranged to connect said cooler or said heater between said air engines, and valves connected for movement together to connect said cooler between said air engines when the same are acting as compressors and to connect said heater between said air engines when the same are acting as motors.

14. In mechanism of the character described, hoisting apparatus for operating a lift, a prime mover for operating said apparatus, an air engine connected to said prime mover, means for controlling said air engine to cause the same to function as a motor or a compressor, and means connecting said controlling means to said apparatus for actuation thereby, said connecting means being synchronized with said apparatus to automatically effect control of said air engine whereby the latter is caused to compensate for the varying load placed upon said prime mover during operation of said apparatus.

15. In mechanism of the character described, hoisting apparatus for operating a lift, a prime mover for operating said apparatus, an air engine connected to said prime mover, means for controlling said air engine to cause the same to function as a motor or a compressor, means connecting said controlling means to said apparatus for actuation thereby, said connecting means being synchronized with said apparatus to automatically effect control of said air engine whereby the latter is caused to compensate for the varying load placed upon said prime mover during operation of said apparatus, and manually-operable means for actuating said controlling means independently of said connecting means.

16. In mechanism of the character described, hoisting apparatus for operating a lift, a prime mover for operating said apparatus, an air engine connected to said prime mover, means for controlling said air engine to cause the same to function as a motor or a compressor, and means connecting said controlling means to said apparatus for actuation thereby, said connecting means being synchronized with said apparatus to automatically effect control of said air engine whereby the latter is caused to compensate for the varying load placed upon said prime mover during operation of said apparatus, said controlling means including means for intensifying the compensating action of said air engine during certain periods in the operation of said apparatus.

17. The combination with hoisting apparatus, an air engine connected thereto, a throttle valve for said engine, and means for controlling said engine to cause the same to function as a motor or a compressor, of means common to said controlling means and said valve for actuating the same, said last-named means being movable in one direction to actuate said controlling means and in a different direction to actuate said valve.

18. Apparatus of the character described comprising a hoisting drum, a prime mover for operating said drum, an air engine connected to said prime mover, means for controlling said air engine to cause the same to function as a motor or a compressor, means for reversing the action of said prime mover, and single means for actuating said controlling and reversing means.

19. In mechanism of the character described, hoisting apparatus for operating a lift, a prime mover of the fluid-pressure type, an air engine, a piston rod common to said prime mover and said air engine, means for controlling said air engine to cause the same to supplement or retard the action of the prime mover, means connected to and synchronized with said apparatus for actuating said controlling means to cause said air engine to compensate for the varying load placed on said prime mover during operation of said apparatus, said controlling means including means for intensifying the compensating action of said air engine, and manually-operable means for actuating said controlling means independently of said second-named means.

20. In combination, hoisting mechanism, a prime mover suitable to perform the positive useful work of the hoisting mechanism and operatively connected thereto, an air engine associated with the prime mover and also operatively connected to the hoisting mechanism and adapted to perform the non-useful work, said air engine being designed and adapted to operate as a compressor and also as an air motor, means to store the compressed air when the air engine is acting as a compressor and to supply the air so stored back to the air engine when it acts as an air motor, and means synchronized with the hoisting mechanism and automatically regulating the action of the air engine in accordance with the requirements of the hoisting mechanism, to cause said air engine to operate as a motor which supplements the action of the prime mover during certain phases of the operation and also to cause said air engine to operate as an air compressor during other phases of the operation, thereby restoring the non-useful work and equalizing the load on the prime mover throughout the run of the hoisting mechanism.

21. In combination, hoisting mechanism for mine shafts, a prime mover therefor, a variable action fluid motor associated with said prime mover and having a power output variable between positive and negative maxima to supplement or retard the actuation of the prime mover, and means controlled by the hoisting mechanism and governing the action of the fluid motor to cause it to boost said prime mover automatically during certain phases of a run of the hoisting mechanism and to retard said prime mover automatically during other phases of a run of the hoisting mechanism.

In witness whereof I have hereto affixed my signature.

BRUNO VICTOR NORDBERG.

CERTIFICATE OF CORRECTION.

Patent No. 1,671,121.  Granted May 29, 1928, to

BRUNO VICTOR NORDBERG.

It is hereby certified that error appears in the printed specification of the above numbered patent requiring correction as follows: Page 6, line 110, claim 4, for the word "thereof" read "therefor"; page 7, line 105, claim 10, insert the word "said" before the word "low"; and that the said Letters Patent should be read with these corrections therein that the same may conform to the record of the case in the Patent Office.

Signed and sealed this 10th day of July, A. D. 1928.

(Seal)

M. J. Moore,
Acting Commissioner of Patents.